US007789744B2

(12) United States Patent
Fiden

(10) Patent No.: US 7,789,744 B2
(45) Date of Patent: Sep. 7, 2010

(54) GAMING MACHINE WITH SPECIAL AWARD FEATURE

(75) Inventor: Daniel P. Fiden, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 708 days.

(21) Appl. No.: 10/787,814

(22) Filed: Feb. 26, 2004

(65) Prior Publication Data

US 2005/0192072 A1 Sep. 1, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ........................................................ 463/17

(58) Field of Classification Search ............. 463/16–22, 463/25, 11; 273/138.1–139

See application file for complete search history.

(56) References Cited

U.S. PATENT DOCUMENTS

| | | | | |
|---|---|---|---|---|
| 3,834,712 | A * | 9/1974 | Cox | 273/143 R |
| 4,721,307 | A * | 1/1988 | Okada | 273/143 R |
| 5,833,537 | A * | 11/1998 | Barrie | 463/21 |
| 6,056,642 | A | 5/2000 | Bennett | 463/20 |
| 6,089,977 | A * | 7/2000 | Bennett | 463/20 |
| 6,190,254 | B1 * | 2/2001 | Bennett | 463/13 |
| 6,251,013 | B1 | 6/2001 | Bennett | 463/13 |
| 6,290,600 | B1 * | 9/2001 | Glasson | 463/20 |
| 6,517,432 | B1 * | 2/2003 | Jaffe | 463/16 |
| 6,551,187 | B1 | 4/2003 | Jaffe | 463/20 |
| 6,604,740 | B1 * | 8/2003 | Singer et al. | 273/292 |
| 7,115,033 | B1 | 10/2006 | Timperley | 463/20 |
| 2003/0022712 | A1 | 1/2003 | Locke | 463/20 |
| 2003/0060267 | A1 | 3/2003 | Glavich et al. | 463/20 |
| 2003/0069063 | A1 | 4/2003 | Bilyeu et al. | 463/20 |
| 2003/0216165 | A1 | 11/2003 | Singer et al. | 463/20 |
| 2004/0048646 | A1 * | 3/2004 | Visocnik | 463/16 |

FOREIGN PATENT DOCUMENTS

| | | | |
|---|---|---|---|
| EP | 1 418 553 | A2 | 5/2004 |
| EP | 1418553 | A2 * | 5/2004 |
| EP | 1 422 673 | A1 | 9/2004 |

OTHER PUBLICATIONS

Search Report dated Jun. 8, 2005 for Application No. GB0500661.4.

* cited by examiner

*Primary Examiner*—Dmitry Suhol
*Assistant Examiner*—Reginald Renwick
(74) *Attorney, Agent, or Firm*—Nixon Peabody LLP

(57) ABSTRACT

The present invention provides a method and apparatus of utilizing symbol markers that, when included in a winning outcome, present an additional award to the player during operation of a slot machine. A symbol marker may be varied in type, frequency, associated award, and quantity. A symbol marker may trigger different award types based on its visual appearance or frequency within a winning combination. Awards can be credits, multipliers, bonus game triggers, and free spins, among others. The order of placement of a symbol marker can be random or defined. The winning outcome that includes a symbol marker can be based on the game's winning outcome definition or on a predetermined location or locations.

15 Claims, 5 Drawing Sheets

GAMING MACHINE WITH SPECIAL AWARD FEATURE

FIELD OF THE INVENTION

The present invention relates generally to gaming machines and, more particularly, to a slot machine including a special award feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by increasing the entertainment value and excitement for the player.

Gaming Machine manufacturers are always trying to develop innovative ways to reward players. From multiple pay lines to special combinations to compelling bonus games, the focus is always on creative entertainment. Including many different award mechanisms is also starting to become important because variety keeps the player interested and, in turn, playing longer. Whether complex or simple, any award mechanism is always appreciated by the player when it is triggered.

To enhance the award mechanisms provided in many gaming machines, an additional method of triggering an award would create more interest and keep a player entertained longer.

SUMMARY OF THE INVENTION

In one embodiment, a method of conducting a wagering game comprises providing a plurality of symbols of different types, marking at least one of the symbols with a marker, thereafter filling an array with symbols selected from the plurality of symbols, providing an award for a winning outcome if the symbols in the array are arranged to define a winning outcome, and enhancing the award if one or more of the symbols in the winning outcome include the marker. An apparatus for conducting a wagering game is also disclosed.

BRIEF DESCRIPTION OF THE DRAWINGS

The foregoing and other advantages of the invention will become apparent upon reading the following detailed description and upon reference to the drawings in which.

Figure 1:
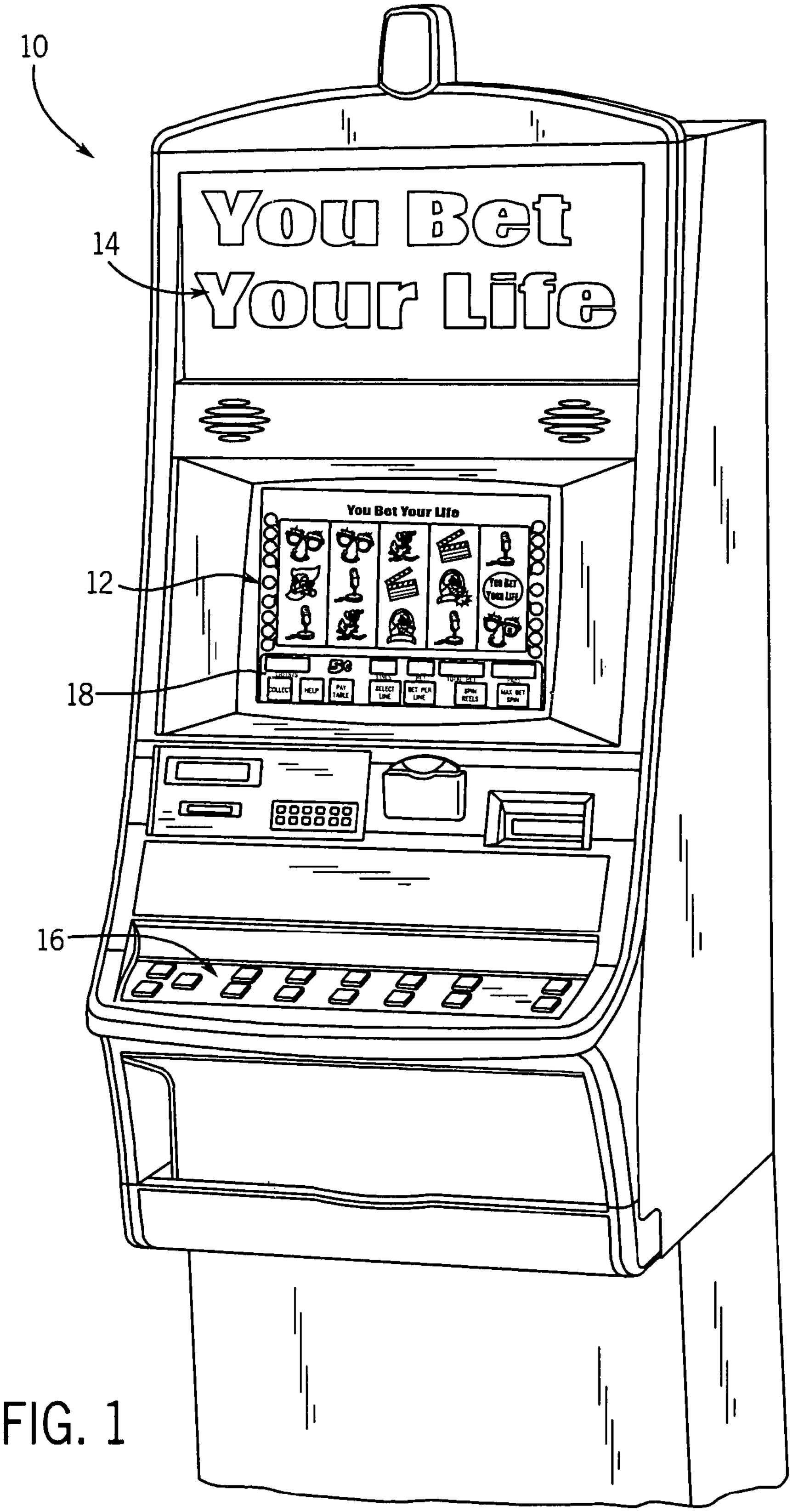
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a video reel slot game. In operation, the gaming machine receives a wager from a player to purchase a "play" of the game. In a "play" of the game, the gaming machine generates at least one random event using a random number generator and provides an award to the player for a winning outcome of the random event. To portray the random event and outcome to the player, the gaming machine includes a video display 12. For a video reel slot game, the video display 12 portrays a plurality of simulated reels that are rotated and stopped to place symbols on the reels in visual association with one or more pay lines.

The video display 12 is preferably in the form of a liquid crystal display (LCD), cathode ray tube (CRT), plasma, or other type of video display known in the art. The display 12 preferably includes a touch screen 18 overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10. In addition to the display 12, the gaming machine 10 may include a secondary display 14 for displaying additional game information such as a bonus feature. The game may be operated by a touch screen 18 or by a button panel 16.

Figure 2:
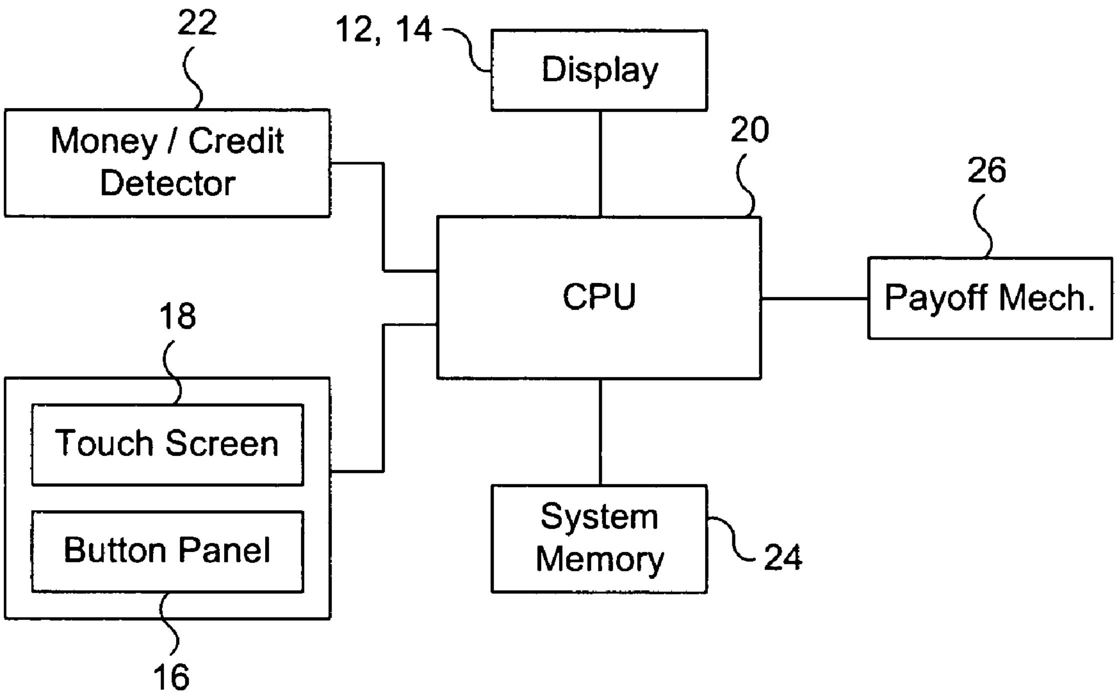
FIG. 2 is a block diagram of a control mechanism used for communication between interface components, a main processor, and display units.

FIG. 2 is a block diagram of a control system suitable for operating the gaming machine. Money/credit detector 22 signals a central processing unit (CPU) 20 when a player has inserted money or played a number of credits. The money may be provided by coins, bills, tickets, coupons, cards, etc. Using the button panel 16 and/or the touch screen 18, the player may select any variables associated with the wagering game and place his/her wager to purchase a play of the game. In a play of the game, the CPU 20 generates at least one random event using the random number generator and provides an award to the player for a winning outcome of the random event. Alternatively, the random event may be generated by a remote computer using a random number generator (RNG) or pooling schema and then transmitted to the gaming machine. The CPU 20 operates the display 12 to represent the random event(s) and outcome(s) in a visual form that can be understood by the player. In addition to the CPU 20, the control system may include one or more additional slave control units for operating one or more of the displays 12 and 14.

System memory 24 stores control software, operational instructions, and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24.

Referring back to FIG. 1, to play the reel slot game, a player selects a number of pay lines and places a wager on the selected lines using the button panel 16 and/or the touch screen 18. In response to pressing a "Spin Reels" button, the CPU spins and randomly stops the plurality of simulated reels on the display 12 to place symbols on the reels in visual association with the pay lines. Other mechanisms, such as a handle, may be used to set the reels in motion. The number of reels and pay lines may be varied to be more or less than what is illustrated. The CPU 20 uses the random number generator to select a game outcome (e.g., "basic" game outcome) corresponding to a particular set of reel "stop positions." The CPU 20 then causes each of the reels to stop at the appropriate stop position. Symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table may be affixed to the machine 10 and/or displayed by the display 12 in response to a command by the player (e.g., by pressing a "Pay Table" key). A winning basic game outcome occurs when the symbols appearing on the reels along a pay line correspond to one of the winning combinations on the pay table. A winning combination, for example, could be a number of matching symbols along an active pay line, where the award is greater as the number of matching symbols along the pay line increases. If the displayed symbols stop in a winning combination, the game credits the player an amount corresponding to the award in the pay table for that combination multiplied by the number of credits wagered on the active pay line. The player may collect the amount of accumulated credits by pressing a "Collect" key.

Figure 3:
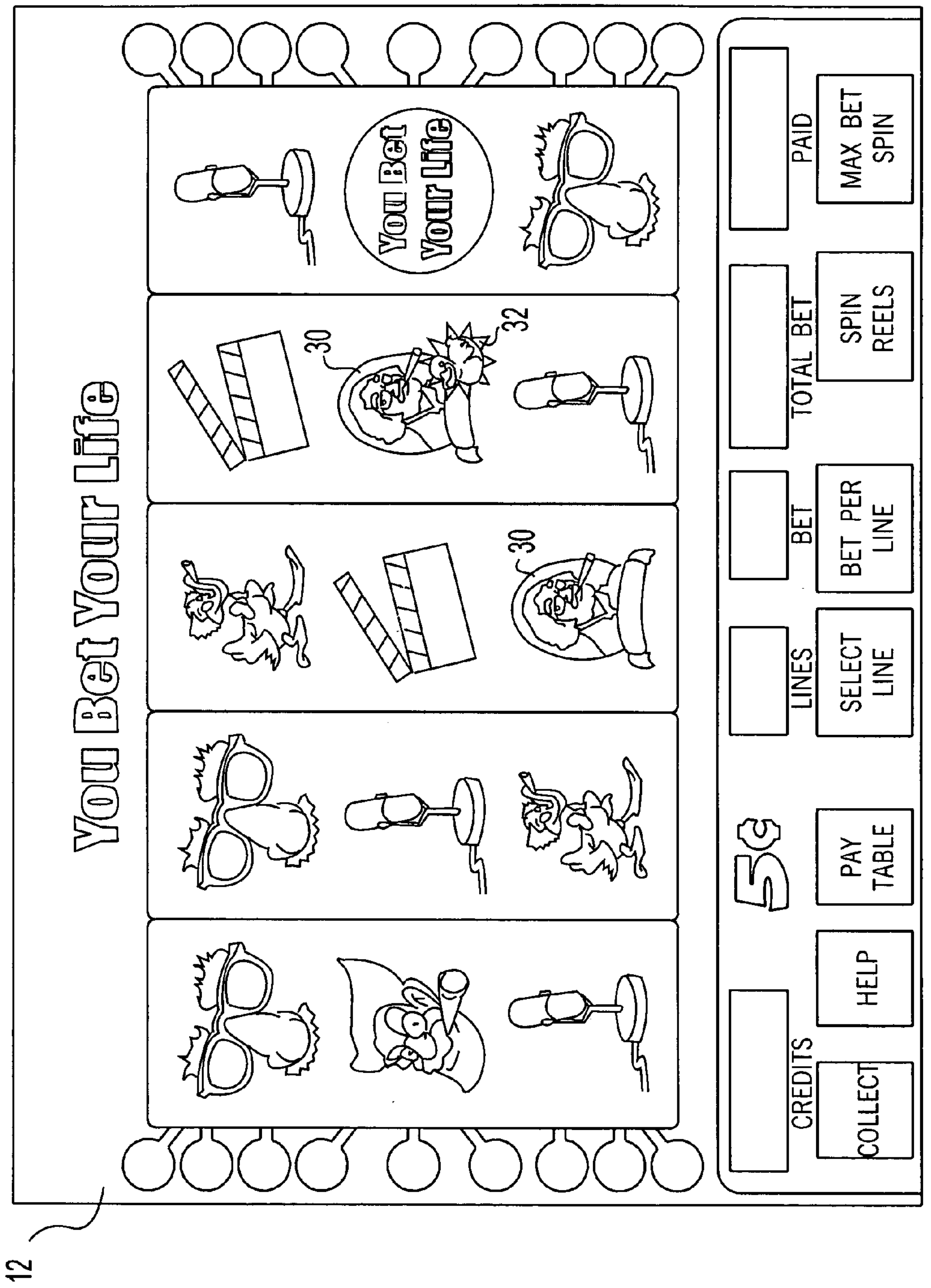
FIG. 3 is a display image associated with a basic slot game and showing a symbol and a symbol marker.

The present invention provides a modifying feature that uniquely identifies a reel symbol. When the unique reel symbol, combined with other unmodified like-symbols, appears in a winning combination, a special award is presented to the player. FIG. 3 shows a display image from an entertaining video reel slot game called "You Bet Your Life". A variety of reel symbols such as the one-dollar bill image of George Washington with eyebrows, glasses, moustache, and cigar 30 (to give the appearance of Groucho Marx) appear on the display. In this example, a single symbol marker (an image of a duck) 32 has been randomly placed by the game on reel symbol 30. As will be appreciated by those with ordinary skill in the art, any number of modifiers may be used depending on the math and entertainment requirements of the game.

Figure 4:
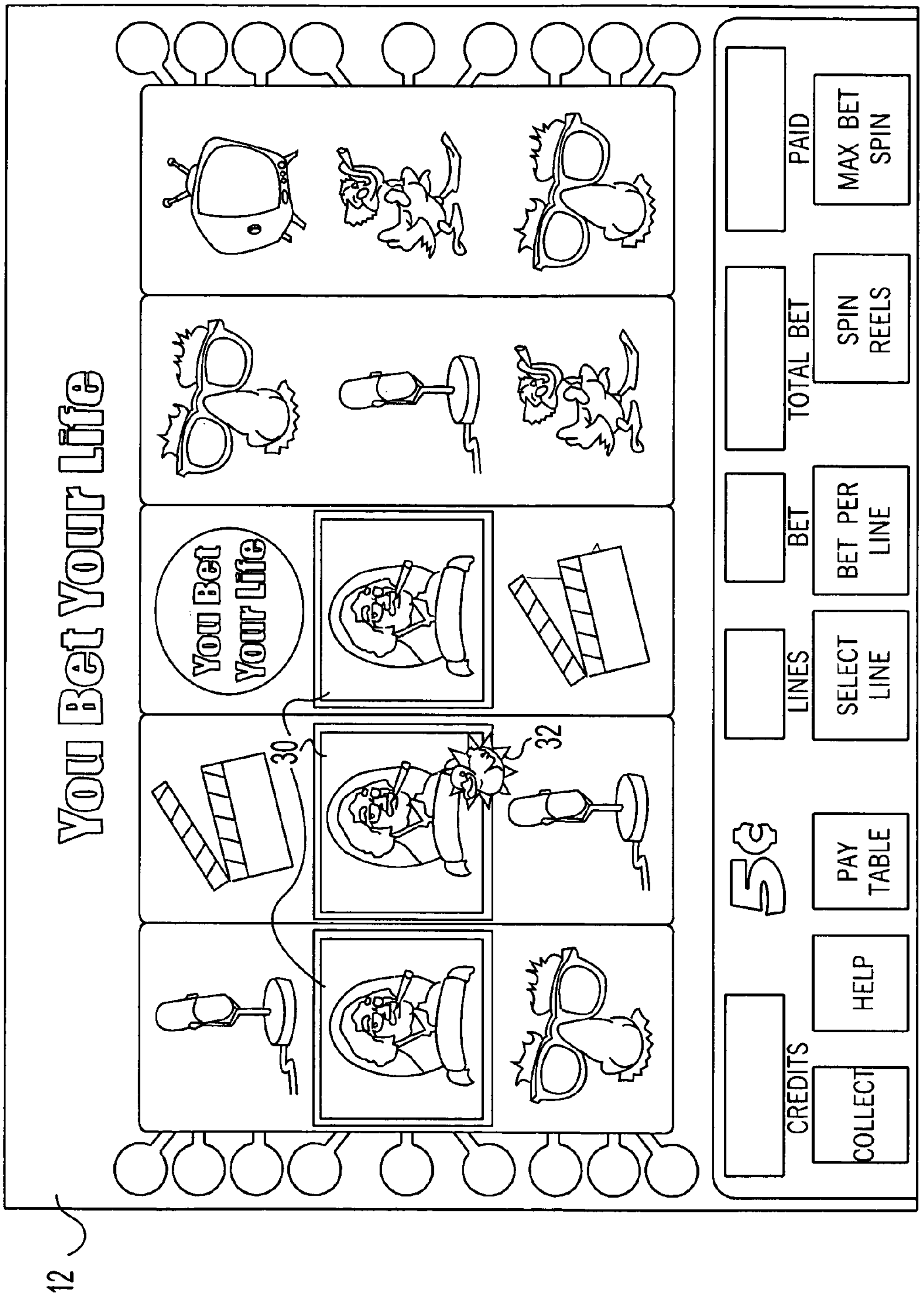
FIG. 4 is a display image associated with a basic slot game and showing a symbol combination with a symbol marker for triggering a bonus feature.

Display 12 in FIG. 4 shows a winning combination that includes the reel symbol 30 with the symbol marker 32. The game pays an award for the standard winning combination as defined by the game's pay table, in this instance, three like symbols on the center pay line in reels one, two, and three.

Figure 5:
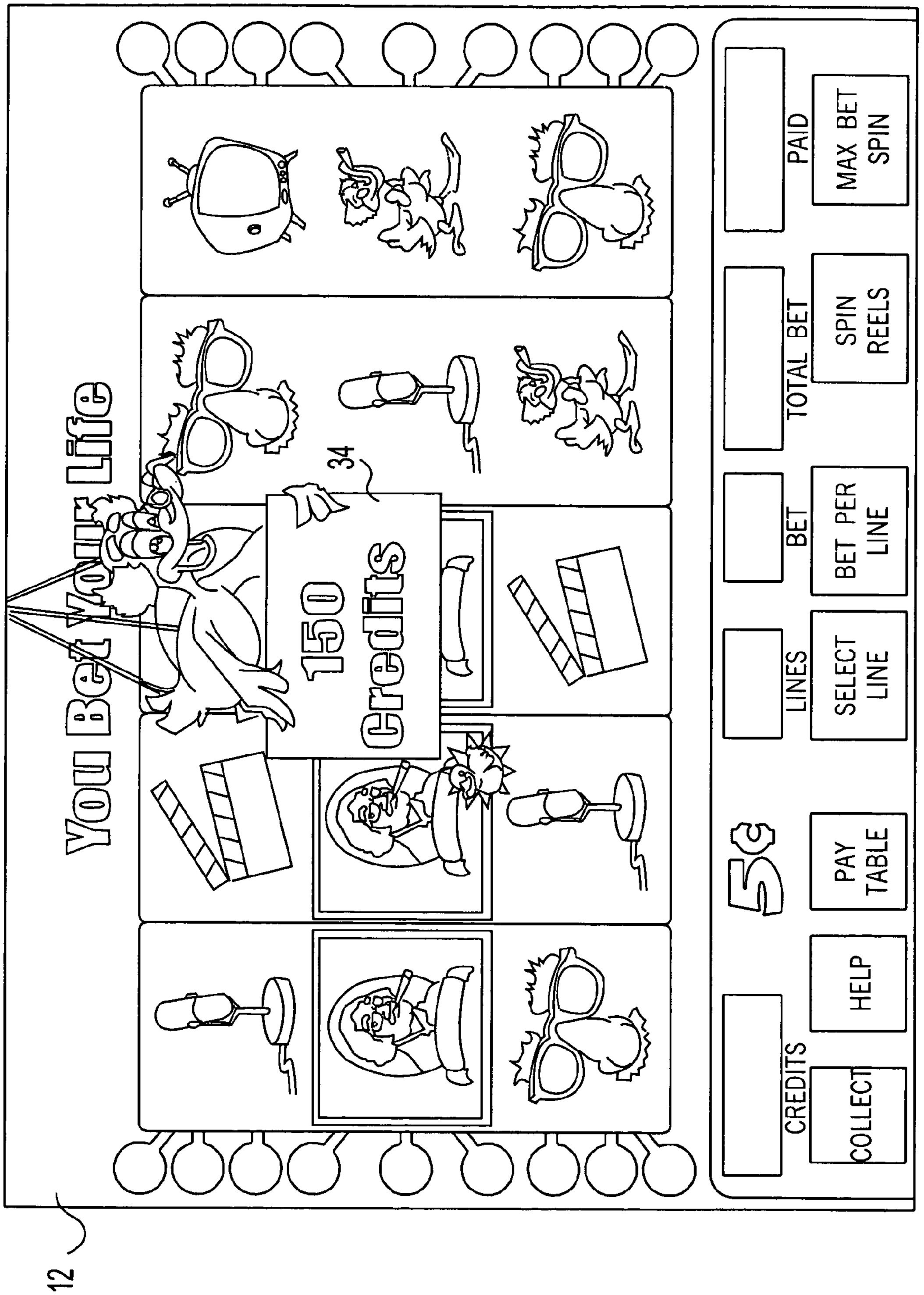
FIG. 5 is a display image associated with a basic slot game and showing a bonus display feature triggered by a winning combination including a symbol marker.

FIG. 5 shows a display screen with an animated character presenting a special award 34 to the player. The special award was triggered by a winning combination of symbols with one symbol having a symbol marker. It will be appreciated by those with ordinary skill in the art that the type of award and manner in which it is presented is dependent on the requirements and entertaining theme of the game. In this example, the next spin causes the symbol marker to move randomly to another reel symbol. The symbol marker remains on that particular reel symbol until it appears in a winning combination. While the present invention has been described with reference to one or more particular embodiments, those skilled in the art will recognize that many changes may be made thereto without departing from the spirit and scope of the present invention.

For example, the type of award presented to the player may be a predefined credit value or a random value based on a range. The award can also be a multiplier for the winning combination or predetermined credit value, a bonus game trigger, or a predefined or random number of free spins.

The frequency of the appearance of the symbol marker may be always, timed, or triggered by another event. It may also be a combination, e.g., a timed appearance that was triggered by another event.

The number of symbol markers may be predefined as one or more or be random. If more than one symbol marker is deployed, the quantity occurring in a winning combination may have an impact on the value of the award.

The placement of the symbol marker may be predefined, random, player selectable, or determined by another event.

The symbol marker may trigger an award or award enhancement if it occurs in a winning combination of reel symbols, predetermined location(s), predetermined pay line, etc.

Symbol markers may be used in games other than mechanical or video slots, including but not limited to video poker, video keno, video bingo, video roulette, and video blackjack.

Each of these embodiments and obvious variations thereof is contemplated as falling within the spirit and scope of the claimed invention, which is set forth in the following claims.

What is claimed is:

1. A method of conducting a wagering game, the wagering game including a game sequence in which a player provides an input and a wagering game outcome is determined, the method comprising the acts of:

accepting a player input via a user interface device, the player input indicative of a wager to play the wagering game;

interpreting the wager via one or more processors, the wager recorded as digital representations in one or more storage devices;

initiating the game sequence of the wagering game via at least one of the processors;

using at least one of the processors to a) provide a plurality of symbols of different types;

b) mark at least one of the plurality of symbols with a marker;

c) after the marking step, fill a first array with symbols selected from the plurality of symbols, the first array of symbols being a first subset of the plurality of symbols of different types;

d) provide an award if the symbols in the first array are arranged to define a winning outcome, the award determined independently of the marker;

e) enhance the award if one or more of the symbols in the winning outcome include the marker; and f) after enhancing the award, mark a different one of the plurality of symbols with the marker prior to a subsequent filling of a second array with symbols selected from the plurality of symbols, the second array of symbols being a second subset of the plurality of symbols of different types, wherein the marker remains on the different one of the plurality of symbols until one or more of the symbols in the second array or a subsequent array are arranged to define another winning outcome that is determined independent of the marker.

2. The method of claim 1, wherein the marking step includes marking a set of the plurality of symbols with the marker, the symbols in the set being of the same type.

3. The method of claim 1, wherein the marker is adjacent or superimposed over the symbol.

4. The method of claim 1, wherein the user interface device includes a touch screen, a button panel, or any combination thereof.

5. The method of claim 1, wherein the one or more storage devices includes a system memory.

6. A method of conducting a wagering game, the wagering game including a game sequence in which a player provides an input and a wagering game outcome is determined, the method comprising the acts of:

accepting a player input via a user interface device, the player input indicative of a wager to play the wagering game;

interpreting the wager via one or more processors;

initiating the game sequence of the wagering game via at least one of the processors;

using at least one of the processors to a) provide a plurality of reels, each reel bearing a plurality of symbols;

b) mark at least one of the plurality of symbols with a marker;

c) after the marking step, rotate and stop the reels in a first spin that places some of the plurality of symbols in a first array;

d) provide an award if the symbols in the first array are arranged to define a first winning symbol combination that is determined independent of the marker;

e) enhance the award if one or more of the symbols in the first winning symbol combination include the marker; and f) after enhancing the award, rotate and stop the reels in a second spin that places some of the plurality of symbols in a second array, the marker moving randomly to a different one of the plurality of symbols prior to the plurality of symbols being placed in the second array, wherein the marker remains on the different one of the plurality of symbols until the plurality of symbols are arranged to define a second winning symbol combination that is determined independent of the marker and one or more of the symbols in the second winning symbol combination include the marker.

7. The method of claim 6, wherein the user interface device includes a touch screen, a button panel, or any combination thereof.

8. The method of claim 6, wherein the one or more storage devices includes a system memory.

9. A method of conducting a wagering game, the wagering game including a game sequence in which a player provides an input and a wagering game outcome is determined, the method comprising the acts of:

accepting a player input via a user interface device, the player input indicative of a wager to play the wagering game;

interpreting the wager via one or more processors;

initiating the game sequence of the wagering game via at least one of the processors;

using at least one of the processors to a) provide a plurality of symbols on one or more reels;

b) randomly mark at least one of the plurality of symbols with a first marker;

c) randomly marking a different one of the plurality of symbols with a second marker;

d) after the marking steps, cause a display device to display at least some of the plurality of symbols in a first array in response to a first spin of the reels, the first array being a subset of the plurality of symbols;

e) provide an award if the symbols in the first array are arranged to define a first winning outcome;

f) enhance the award if one or more of the symbols in the first winning outcome include the first or second marker; and g) after enhancing the award, move at least one of the first or second markers to a different one of the plurality of symbols, the marker remaining on the different one of the plurality of symbols until the plurality of symbols are arranged to define a second winning outcome that is determined independent of the marker and one or more of the symbols in a subsequent winning outcome include at least one of the first or second marker.

10. The method of claim 9, wherein the user interface device includes a touch screen, a button panel, or any combination thereof.

11. The method of claim 9, wherein the one or more storage devices includes a system memory.

12. An apparatus for conducting a wagering game, comprising:

a display for presenting a plurality of symbols of different types; and a controller operative to:

mark at least one of the plurality of symbols with a marker;

after the marking step, fill a first array with symbols selected from the plurality of symbols such that the symbols in the first array are a first subset of the plurality of symbols;

provide an award if the symbols in the first array are arranged to define a winning outcome, the winning outcome determined independent of the marker;

enhance the award if one or more of the symbols in the winning outcome include the marker; and marking a different one of the plurality of symbols with the marker prior to a subsequent filling of a second or subsequent array with symbols selected from the plurality of symbols, the second or subsequent array of symbols being a second or subsequent subset of the plurality of symbols, wherein the marker remains on the different one of the plurality of symbols until the plurality of symbols are arranged such that the second or subsequent array defines another winning outcome determined independent of the marker and such that one or more of the symbols in the another winning outcome include the marker.

13. The apparatus of claim 12, wherein the controller is operative to randomly mark the symbol or symbols.

14. The apparatus of claim 12, wherein the controller is operative to mark the symbol or symbols in response to player input.

15. A non-transitory computer-readable medium encoded with a program for implementing a method, said program for directing a computer device to perform on a processor the steps of:

presenting a plurality of symbols of different types;

marking at least of the plurality of symbols with a marker;

filling a first array with symbols selected from the plurality of symbols, the first array of symbols being a first subset of the plurality of symbols;

providing an award if the symbols in the first array are arranged to define a winning outcome, the award determined independently of the marker;

enhancing the award if one or more of the symbols in the winning outcome include the marker; and after enhancing the award, marking a different one of the plurality of symbols with the marker prior to a subsequent filling of a subsequent array with symbols selected from the plurality of symbols, wherein the marker remains on the different one of the plurality of symbols until one or more of the symbols in a subsequent array are arranged to define another winning outcome that is determined independent of the marker.

* * * * *